United States Patent Office 3,295,923
Patented Jan. 3, 1967

3,295,923
PRODUCTION OF ALUMINUM HEXAHYDRO-
SULFATE HEPTAHYDRATE
Charles R. Dickey, St. Albans, W. Va., assignor to Union
Carbide Corporation, a corporation of New York
No Drawing. Filed Feb. 15, 1963, Ser. No. 258,885
5 Claims. (Cl. 23—123)

This invention relates to a novel method of producing hydrated aluminum hexahydrosulfate, particularly aluminum hexahydrosulfate heptahydrate.

The preparation of aluminum hexahydrosulfate heptahydrate has been described in U.S. Patent 2,549,921, in conjunction with the polymerization of vinyl alkyl ethers, wherein said compound is employed as a catalyst. The method of preparation of aluminum hexahydrosulfate described in that patent involves heating a solution of aluminum sulfate octadecahydrate [$Al_2(SO4)_3 \cdot 18H_2O$] with from 5 to 100 percent of the theoretical amount of concentrated sulfuric acid required to form the hexahydrosulfate salt complex. A principal disadvantage of this method, however, is the difficulty of controlling the optimum degree of dehydration of the aluminum hexahydrosulfate octadecahydrate to produce the heptahydrate form of aluminum hexahydrosulfate. It has been found that the catalytic activity of aluminum hexahydrosulfate in the polymerization of vinyl alkyl ethers is optimum when the degree of hydration of said catalyst is from 5 to 7 moles of water per mole of aluminum hexahydrosulfate, with aluminum hexahydrosulfate heptahydrate being the most active, and hence the most preferred catalyst. Therefore, unless the temperature and heating time are carefully controlled, the foregoing method will invariably produce aluminum hexahydrosulfate in which the degree of hydration is less than 5 or more than 7 moles of water per mole of said catalyst. These compounds, however, do not possess the high degree of catalytic activity which is possessed by the heptahydrated catalyst when employed in the polymerization of vinyl alkyl ethers. Another disadvantage of this method is the use of large quantities of sulfuric acid. This necessitates the use of large quantities of solvent to wash the acid, and requires additional process steps such as filtration, solvent recovery, etc.

Another method of producing aluminum hexahydrosulfate heptahydrate involves the hydration of anhydrous aluminum hexahydrosulfate under suitable conditions. The difficulty with this procedure, however, is that a mixture of sulfates is produced having varying degrees of hydration which lacks a high degree of activity in the polymerization of vinyl alkyl ethers.

Accordingly, this invention is directed to a novel method of producing aluminum hexahydrosulfate heptahydrate catalyst which comprises contacting aluminum hydroxide with concentrated sulfuric acid in a reaction zone, and recovering said catalyst therefrom. The reaction is highly exothermic and, in case of producing the heptahydrated catalyst, may be represented by the following equation:

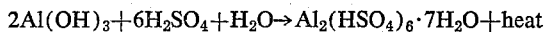

$$2Al(OH)_3 + 6H_2SO_4 + H_2O \rightarrow Al_2(HSO_4)_6 \cdot 7H_2O + heat$$

Considerably less quantities of sulfuric acid is employed in this reaction as compared to the process described in the foregoing patent. Consequently, appreciable amount of saving is realized both with respect to the quantities of sulfuric acid employed, the amount of solvent necessary for washing the acid, etc.

The reaction is effected at a temperature not exceeding about 120° C., preferably at about 70° C. to 90° C. Temperatures higher than about 120° C. are undesirable since aluminum hexahydrosulfate heptahydrate tends to dehydrate to the less hydrated and less active forms of aluminum hexahydrosulfate. Since, as it was previously pointed out, the reaction between aluminum hydroxide and sulfuric acid is highly exothermic, the reaction zone is preferably provided with cooling means such as cooling coils, cooling jacket, etc., in order to remove the heat of reaction and control the reaction temperature.

The pressure in the reaction zone is not critical and may be subatmospheric, atmospheric or superatmospheric.

The reaction between aluminum hydroxide and sulfuric acid is essentially instantaneous, hence the residence time of the reactants in the reaction zone is not narrowly critical. However, prolonged residence time is undesirable, particularly at elevated temperatures, since the resulting aluminum hexahydrosulfate heptahydrate tends to dehydrate to the less hydrated and less active forms of the catalyst.

The molar ratio of sulfuric acid to aluminum hydroxide can be varied from about 1.15:1 to 3:1 (stoichiometric). When the stoichiometric quantities of the reactants are employed the product is essentially aluminum hexahydrosulfate heptahydrate which is, as was previously mentioned, the most active form of the catalyst in the polymerization of vinyl alkyl ethers. Sulfuric acid to aluminum hydroxide ratios of less than stoichiometric result in the production of the less active hydrated form of aluminum hexahydrosulfate which may be desirable for the polymerization of vinyl alkyl ethers having high rates of polymerization. Thus the degree of catalytic activity of the aluminum hexahydrosulfate can be controlled with good reproducibility, by varying the molar ratio of the reactants within the foregoing limits. The aluminum hydroxide is preferably employed as anhydrous, chemically pure compound in finely comminuted form and the sulfuric acid reactant is preferably 95–98% in strength.

In one embodiment of this invention, powdered anhydrous aluminum hydroxide and concentrated (95–98%) sulfuric acid may be charged to a reaction vessel which is provided with a dry blending agitator, or any other suitable means for securing adequate blending of the reactants. The heat of the reaction is removed by external cooling coils, and solid aluminum hexahydrosulfate heptahydrate is withdrawn from the reaction vessel at the termination of the reaction.

The novel reaction is preferably carried out in a dry, inert atmosphere such as nitrogen, carbon dioxide, etc., to prevent the deterioration of the catalyst. The presence of moisture in the air may otherwise result in the loss of catalytic activity due to the hydration thereof. The reaction may also be effected in the presence of inert diluents such as, for example, dialkyl ethers wherein the alkyl moiety contains from 2 to 7 carbon atoms, preferably from 2 to 5 carbon atoms. Examples of dialkyl ethers which can be satisfactorily employed as inert diluents are diethyl ethers, diisopropyl ether, di-N-butyl ether, etc., if desired.

The novel reaction can be conveniently carried out in ordinary reaction vessels equipped with suitable blending and agitating device. In view of the corrosive action of sulfuric acid, however, corrosion-resistant materials of construction are preferred.

EXAMPLE 1

Sixteen grams (0.205 mole) of powdered anhydrous aluminum hydroxide and 62 grams (0.607 mole) of concentrated (95–98%) sulfuric acid were placed in a 250-milliliter beaker and mixed thoroughly with a spatula. The reaction proceeded smoothly for 8 minutes during which period the temperature rose from 28° C. to 51° C. Thereafter the reaction proceeded violently (with particles exploding in the beaker), the temperature rose rapidly to 150° C. in 2 minutes and the materials solidified in the beaker. A sample of this solidified material was removed and tested for its catalytic activity in accordance with the test procedure set forth below. The catalytic activity of the solidified material was determined to be 35 seconds.

*Test procedure for determining catalytic activity*

Ten milliliters of pure vinyl butyl ether and 1 milligram of the catalyst (the solidified material obtained in Example 1) were placed in a test tube and the mixture was stirred with a thermometer. A sudden increase in the viscosity of the mixture was observed indicating the polymerization of vinyl butyl ether. The viscosity of the mixture continued to increase until no further change in viscosity was noticeable. The temperature of the mixture rose steadily and the time necessary for this temperature to reach 80° C. was measured by a stop watch. This time was arbitrarily set as an index of the catalyst activity and will be referred to as the induction period. An induction period of less than 1 minute is hereby defined as indicative of high catalytic activity, an induction period of from 1 to 3 minutes is defined as being indicative of mild catalytic activity whereas an induction period of more than 3 minutes is defined to be indicative of poor catalytic activity.

EXAMPLE 2

Sixteen grams (0.205 mole) of powdered anhydrous aluminum hydroxide and 62 grams (0.607 mole) of concentrated (95–98%) sulfuric acid were placed in a 250-milliliter beaker and mixed thoroughly with a spatula. The beaker was immersed in an ice bath and the reaction temperature was maintained between 48° C. and 82° C. for 26 minutes, after which the temperature began to drop. The beaker was then placed in an oven at 110°–115° C. and heated for 2 hours. A sample of the product (catalyst) was removed from the beaker and tested for its catalytic activity by the foregoing procedure. A second sample was aged for 4 hours at 100° C. and its catalytic activity was likewise tested. The resulting catalytic activities of these two samples were determined to be 27 seconds and 30–35 seconds, respectively.

EXAMPLE 3

Nineteen and a half grams (0.25 mole) of powdered anhydrous aluminum hydroxide and 57.5 grams (0.562 mole) of concentrated (95–98%) sulfuric acid were placed in a 250-milliliter beaker and mixed thoroughly with a spatula. The beaker was immersed in an ice bath to maintain the reaction temperature below 100° C. and the reactants were constantly stirred until the reaction was no longer exothermic. The beaker was then heated in an oven at 100° C. for one hour. A sample of the resulting product was ground to a powder and heated for 2 hours. The catalytic activity of this product (catalyst) as determined by the previously mentioned test, was determined to be 90 seconds. Another sample from the beaker after heating in 100° C. was wet ground in heptane. Its catalytic activity as determined by the foregoing procedure was 60 seconds.

What is claimed is:

1. A process for producing hydrated aluminum hexahydrosulfate which comprises contacting from about 1.15 to about 3 moles of concentrated sulfuric acid with 1 mole of aluminum hydroxide in a reaction zone at a temperature below about 120° C., and recovering said hydrated aluminum hexahydrosulfate as product.

2. The process of claim 1 wherein said reactants are employed in stoichiometric quantities and the product recovered is aluminum hexahydrosulfate heptahydrate.

3. The process of claim 1 wherein said reaction is carried out in the presence of an inert diluent.

4. The process of claim 1 wherein said reaction is carried out at an inert atmosphere.

5. The process of claim 2 wherein said reaction is carried out at a temperature of from about 70° C. to about 90° C.

References Cited by the Examiner
UNITED STATES PATENTS
2,549,921   4/1951   Mosley _____ 23—123 X MILTON WEISSMAN, *Primary Examiner.*

E. THOMAS, *Assistant Examiner.*